US006421651B1

(12) United States Patent
Tedesco et al.

(10) Patent No.: US 6,421,651 B1
(45) Date of Patent: Jul. 16, 2002

(54) METHOD AND APPARATUS FOR PRIORITY-BASED JUKEBOX QUEUING

(75) Inventors: Daniel E. Tedesco; James A. Jorasch, both of Stamford; Magdalena Mik, Wallingford, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/481,348

(22) Filed: Jan. 12, 2000

Related U.S. Application Data

(63) Continuation of application No. 09/052,834, filed on Mar. 31, 1998.

(51) Int. Cl.[7] ............................................. G06F 17/60
(52) U.S. Cl. ..................... 705/8; 705/5; 705/6; 705/7
(58) Field of Search ............................ 705/8, 6, 7, 5

(56) References Cited

U.S. PATENT DOCUMENTS

| | | |
|---|---|---|
| 3,985,217 A | 10/1976 | Kortenhaus et al. |
| 4,013,157 A | 3/1977 | Britz et al. |
| 4,232,295 A | 11/1980 | McConnell |
| 5,185,727 A | 2/1993 | Blakeway et al. |
| 5,341,350 A | 8/1994 | Frank et al. |
| 5,355,302 A | 10/1994 | Martin et al. |
| 5,375,106 A | 12/1994 | Kawachi et al. |
| 5,394,384 A | 2/1995 | Aoyagi et al. |
| 5,555,441 A * | 9/1996 | Haddad ..................... 455/4.2 |
| 5,631,694 A * | 5/1997 | Aggarwal et al. ............ 348/7 |
| 5,668,788 A | 9/1997 | Allison |
| 5,805,804 A * | 9/1998 | Laursen et al. ........ 395/200.02 |
| 5,835,843 A * | 11/1998 | Haddad ..................... 455/4.2 |
| 5,881,311 A * | 3/1999 | Woods ....................... 395/824 |
| 5,898,594 A * | 4/1999 | Leason et al. ......... 364/479.01 |
| 5,946,388 A | 8/1999 | Walker et al. ............. 379/266 |
| 5,959,945 A | 9/1999 | Kleiman |
| 5,999,499 A | 12/1999 | Pines et al. .................... 369/34 |
| 6,112,101 A * | 8/2000 | Bhatia et al. ................ 455/512 |

FOREIGN PATENT DOCUMENTS

| | | | |
|---|---|---|---|
| DE | 4303056 | 8/1993 | |
| DE | 19614820 | 10/1997 | |
| EP | 0 817 138 A1 | 1/1998 | |
| GB | 2 204 180 A | 11/1988 | |
| NL | 7901801 | 9/1980 | |
| WO | WO 99/20073 | * 10/1997 | ............ H04Q/7/38 |

OTHER PUBLICATIONS

Juke Management–Think outside the box, Transform, Aug. 1999, Imaging Magazine Web.*

Commimng Attractions–ADIC, ALLStor, KOM and Qstar Jukebox Management Systems Compared, Transform, Aug. 1999, Imaging Magazine Web.*

Liz Levy, Putting CD Jukeboxes in their places, Transform, May 1999, Imaging Magazine Web.*

Schwed, Mark "High–Tech Saloon For TV Generation," BC Cycle, May 7, 1985.

(List continued on next page.)

Primary Examiner—Frantzy Poinvil
Assistant Examiner—Pedro Kanof
(74) Attorney, Agent, or Firm—Dean P. Alderucci

(57) ABSTRACT

A method and apparatus are described for managing a request queue for a jukebox system. According to one aspect of the present invention, a method is disclosed for managing a queue of a jukebox. The method includes the step of arranging a set of service identifiers in a queue based upon a time of receipt corresponding to each service identifier. The method also includes the step of receiving a request to expedite an identified service corresponding to one service identifier in the queue. According to the method, payment is then received for the request to expedite the identified service. The method further includes the steps of rearranging the plurality of service identifiers in the queue, thereby causing the identified service to be expedited, and performing the service.

8 Claims, 7 Drawing Sheets

OTHER PUBLICATIONS

Schwed, Marl "High–Tech Saloon for TV Generation," UPI, May 7, 1985.

Matsumoto, Craig, "Obscure Programmers First in Line to Help Send Landmark Cybercheck," Business Dateline; Business Journal–San Jose, Sep. 18, 1995.

Agorics, Inc.—Bid Priority Queue (http://www.webcom.com/agorics/text/bpq.html), download date: Feb. 2, 1998.

NSM Jukebox Brochures for Emerald Ice, Performer Grand 2000 and Performer Wall 2000.

Loeb, Shoshana, "Architecting Personalized Delivery of Multimedia Information", Communications of the ACM, Dec. 1992, vol. 35, No. 12, pp. 39–48, ISSN: 0001–0782.

Tedesco et al., U.S. Pending Application: 08/947,798, Filing date: Oct. 9, 1997.

* cited by examiner

QUEUE TABLE 132

| TOTAL PLAY TIME 7:39 | | | | |
|---|---|---|---|---|
| CONTENT IDENTIFIER 202 | POSITION IDENTIFIER 203 | POSITION STATUS 204 | DURATION MIN:SEC 205 | UPGRADE PRICE 206 |
| 0511 | 1 | LOCKED | 3:27 | $3.00 |
| 1204 | 2 | AVAILABLE | 4:12 | $2.00 |
| RANDOM PLAY | 3 | AVAILABLE | N/A | $1.00 |

FIG. 2A

QUEUE TABLE 132

| TOTAL PLAY TIME 7:39 | | | | |
|---|---|---|---|---|
| CONTENT IDENTIFIER 202 | POSITION IDENTIFIER 203 | TIMES BUMPED 207 | DURATION MIN:SEC 205 | UPGRADE PRICE 206 |
| 0511 | 1 | 0 | 3:27 | $3.00 |
| 1204 | 2 | 1 | 4:12 | $2.00 |
| RANDOM PLAY | 3 | 2 | N/A | $1.00 |

FIG. 2B

METHOD AND APPARATUS FOR PRIORITY-BASED JUKEBOX QUEUING

CROSS REFERENCE TO RELATED APPLICATIONS

The present application is a continuation of U.S. patent application Ser. No. 09/052,834 filed Mar. 31, 1998.

BACKGROUND OF THE INVENTION

The present invention relates generally to service-based vending machines and, more specifically, to vending machines providing music entertainment (commonly called jukeboxes).

Jukeboxes are a well-known form of vending machine. Many restaurants and bars operate jukeboxes as an additional revenue source. Customers use jukeboxes to hear song selections that they wish to hear during their visit to the establishment. Customers typically deposit currency and select the song or songs that they wish to hear. The jukebox receives customer selections and plays the requested songs in the order that they were requested.

When an establishment featuring a jukebox has a large number of customers, requests may be taken by the jukebox at a faster rate than the songs are played. At these times, customers must wait longer to hear the songs that they requested. Some customers may not even hear the songs that they requested before they leave the establishment. Anticipating a long wait, many customers are reluctant to request songs during busy times. This problem both inconveniences customers and results in a missed revenue opportunity for jukebox operators.

A "WebMart Jukebox" has been described by Agorics, Inc. and Sun Labs that allows customers to bid in an auction system for priority service. This jukebox system includes a "Bid Priority Queue" as a list of objects or resources to be serviced, sorted in a specific order based on a price bidding policy. Such a bid priority queue may be used with a policy where songs with the highest bids would be serviced (played) first.

However, with the WebMart Jukebox the user cannot predict in advance the amount of money required to purchase expedited service. Additionally, there are no assurances that bids placed by the user will result in receipt of expedited service. This system also does not verify that an appropriate payment was made. Furthermore, given the continuous nature of jukebox service delivery, it is not practical to require that consumers constantly bid for the priority of their services.

An article published by United Press International describes a "video cafe" with a video jukebox incorporating a computer. This computer displays the most requested songs, with a disk jockey giving priority to a particular song on the basis of the number of requests for it. However, consumers with unpopular requests have no way to obtain priority service.

A number of jukeboxes are known which can identify the songs in the request queue. For example, a machine offered by NSM-America can display the next ten songs that are requested in the queue in the order that they will be played. This jukebox displays a scrolling list on its LED display of the next ten requested songs by CD and track number.

U.S. Pat. No. 4,013,157 entitled "Bonus Play Machine" describes a machine that randomly makes offers to pick additional songs for additional, discounted payment.

U.S. Pat. No. 5,185,727 entitled "Coin or Token Operated Machine for Playing Pre-Recorded Record Discs" discloses a system for ordering the songs in a jukebox based on when they were last played.

U.S. Pat. No. 5,668,788 entitled "Programmed Juke Box Capable of Calculating a Continuous Updated Playlist" discloses a jukebox for playing tracks off audio media including a video output device with a touch panel. The jukebox's controller can make up playlists based on the popularity of each performance as indicated by registered choices.

U.S. Pat. No. 4,232,295 entitled "Jukebox Polling System" enables a data acquisition and transmission system for surveying a plurality of remotely located jukeboxes via telephone lines. A data collector includes a song identification arrangement and storage memory for determining the number of times a particular song is played over a given period of time. This data can be periodically uploaded to a central server which tabulates and stores the information. The collected data is then processed to provide a distribution scale useful in determining the proper allocation of royalty fees received from jukebox licensing fees.

In general, the above-described systems do not manage requests and prioritize a request queue based on the receipt of an additional payment. Accordingly, there is a need for an improved jukebox system that allows customers to obtain priority service.

SUMMARY OF THE INVENTION

In view of the prior art, it is desirable to enable a jukebox to more efficiently manage sales by controlling the queue of customer requests. In particular, it is desirable to give a customer the opportunity to pay a premium to (1) obtain priority service from the jukebox (in other words, to upgrade his position in the queue), or (2) avoid having other requests advanced ahead of his own (in other words, to reserve or "lock in" a position in the queue, thereby avoiding being "bumped" or downgraded in priority).

The present invention provides a jukebox method and apparatus for efficiently managing sales. By allowing customers to pay more for priority service, the jukebox of the present invention collects a more accurate measure of request demand than is available in conventional jukeboxes. The collection of demand data and additional payment enables the machine to prioritize its services. Accordingly, the present invention allows jukebox operators to collect an additional revenue stream by accepting payment for priority services.

According to on aspect of the present invention, a method is disclosed for managing a queue of a jukebox. The method includes the step of arranging a set of service identifiers in a queue based upon a time of receipt corresponding to each service identifier. Specifically, as each additional song request is processed, it is added to the tail or bottom of the queue. Service identifiers at the bottom of the queue are processed last.

The method further includes the step of receiving a request to expedite an identified service corresponding to one service identifier in the queue. This step occurs when a customer requests priority service for his song. The method also includes the step of receiving payment for the request to expedite the identified service.

In response to the request for expedited service and the receipt of payment, the plurality of service identifiers is arranged in the queue, thereby causing the identified service to be expedited. Thereafter, the service is performed in accordance with the associated service identifiers position in the queue. An apparatus configured to perform the steps of the described method is also disclosed.

BRIEF DESCRIPTION OF THE DRAWINGS

FIG. 2A is a schematic diagram of the structure of the queue table stored in the data storage device of the jukebox depicted in FIG. 1.

FIG. 2B is a schematic diagram of an alternative structure of the queue table stored in the data storage device of the jukebox.

DETAILED DESCRIPTION OF THE PREFERRED EMBODIMENTS

Figure 1:
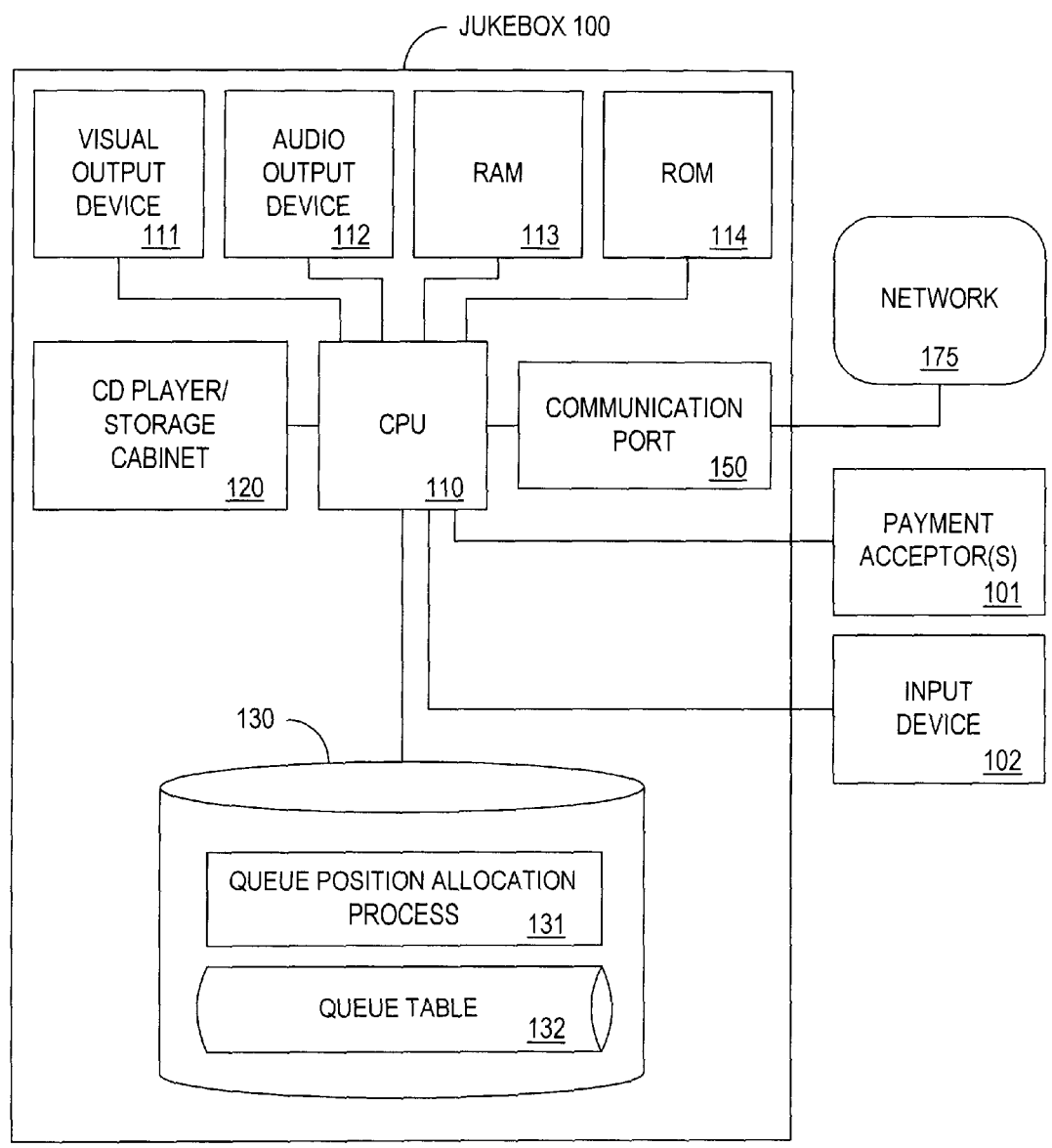
FIG. 1 is a block diagram illustrating the jukebox apparatus according to an embodiment of the present invention.

A jukebox embodying the features of the present invention is shown schematically in FIG. 1. The jukebox 100 is controlled by a CPU 110; the CPU has several input/output and memory devices connected thereto, including RAM 113 and ROM 114. The CPU 110 is connected to one or more payment acceptors 101 and to an input device 102. The payment acceptor 101 may include a coin acceptor, a paper currency validator and acceptor, chip-based card reader and/or a credit card magnetic stripe reader. For example, the payment acceptor may be a conventional device (such as Mars models AD-2400, MC5000, TRC00 or CoinCo model 9300-L). The input device 102 may be a keypad, touch screen or the like capable of receiving input from customers, thereby allowing customers to identify content requests. Input device 102 may also serve to facilitate payment by receiving credit card numbers or pre-registered purchase codes. The jukebox includes a visual output device 111 (such as an LCD display, an LED display, or CRT screen) and an audio output device 112 (typically speakers), also connected to the CPU 110.

The jukebox also includes a CD player and CD storage cabinet 120, for example NSM model CDR 100 XA, or any NSM Satellite or NSM Mercury Series player/cabinet; the CD player is connected to and preferably controlled by the CPU 110. The jukebox also includes a data storage device 130, connected to the CPU 110. The data storage device 130 has stored therein queue position allocation process software 131, queue table 132, and, optionally, purchase codes.

In an alternate embodiment, jukebox 100 may be connected to network 175 via communication port. As such, queue allocation process 131 may include instructions for processing requests based on external inputs, such as point-of-sale data, received via network 175.

Pending requests made by customers, and the priority thereof, are stored in the queue table 132. The structure of the queue table is shown schematically in FIG. 2A. The queue table includes the total playing time 201 for all the songs in the queue. Each specific song requested has an entry in the queue table and is identified by a service identifier or content identifier 202 (for example, the disk number and track number of a particular CD). The position identifier 203 indicates the position of a given request in the queue. Positions that have not yet been reserved by customer requests may be filled by the jukebox. In this case the jukebox would determine the content to be played either randomly or according to content popularity. Content popularity may be determined based on the historical frequency with which the selection is requested. Of course, selections could alternatively be arranged to be played in the order in which the corresponding requests are received (i.e. based on the time of receipt of each request).

The position status 204 indicates whether a given request's position in the queue is "locked" or "available" (that is, whether that position may be given to a different customer selection as a result of purchase of an upgrade). Each content identifier (except for "random play") has associated therewith a play duration 205. Each position in the queue has associated therewith an upgrade price 206. This price may be either fixed (that is, depending only on the position identifier) or variable (depending on factors such as the overall demand for the selection in that position, how many selections have been bumped, etc.).

The CPU 110 processes requests listed in the queue table 132 in order according to the position identifier 203; the CPU 110 instructs the CD player 120 to play the selections (identified by the content identifier 202) in priority order.

Queue Position Allocation Process

In this embodiment, a customer may purchase and "lock in" a position in the queue until his selection is played, so that the jukebox will not offer that position for sale until his request is honored. A given position identifier 203 thus has a fixed price 206 associated therewith. The schedule of fixed prices is output by the CPU 110 and displayed on the visual output device 111 ("1st position=$3.00, 2nd position=$2.00, 3rd position=$1.00", using the example shown in FIG. 2).

Figure 3A:
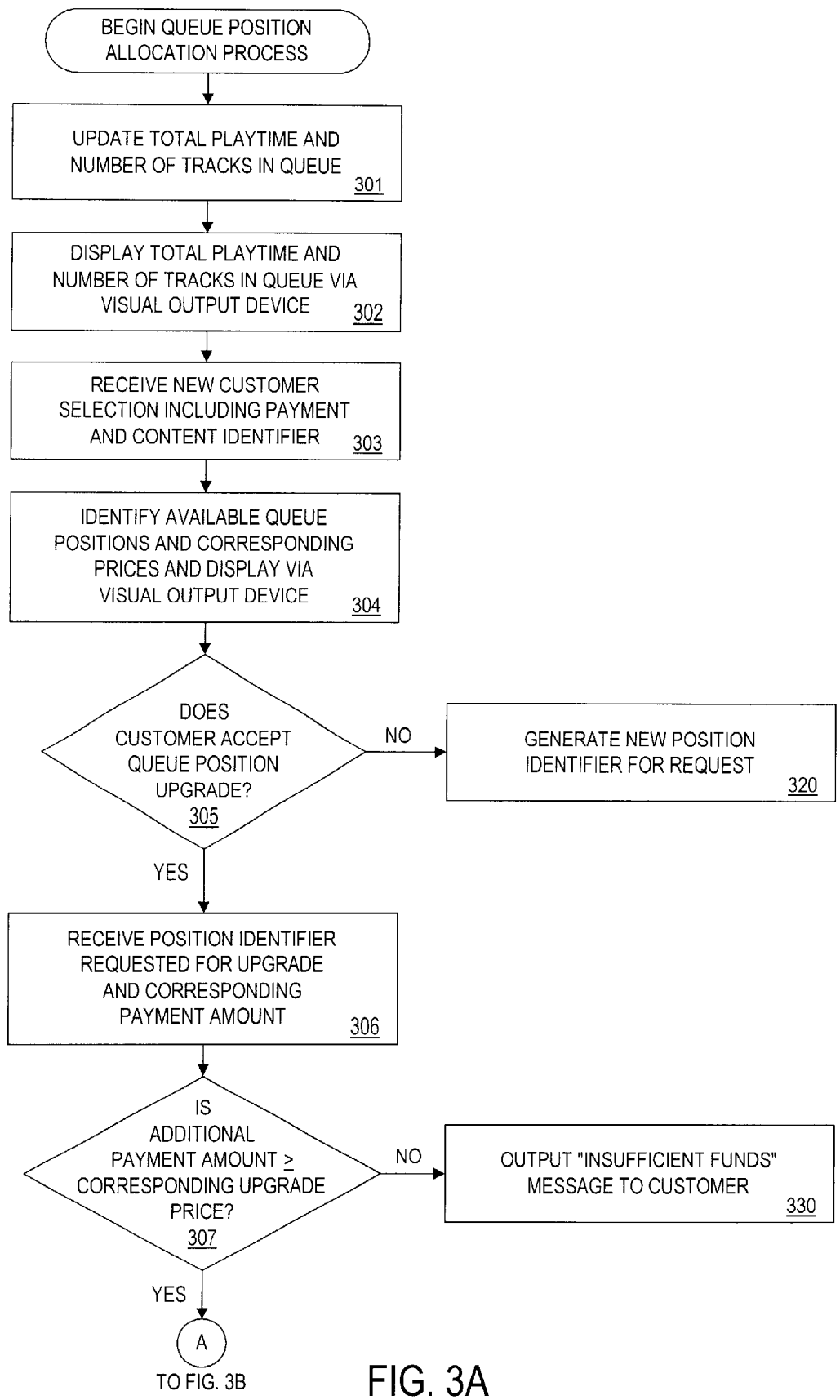
FIGS. 3A and 3B are connected flow charts showing the operation of the queue position allocation process in accordance with the first embodiment of the invention.
Figure 3B:
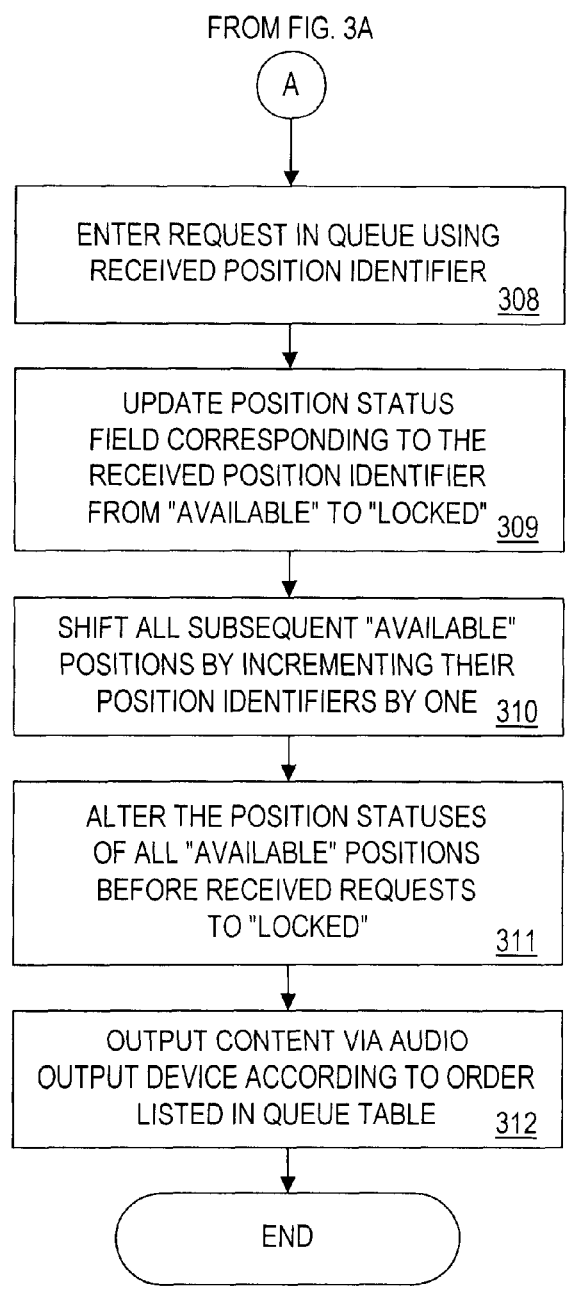

The CPU 110 executes the process software 131 to perform the steps detailed in FIGS. 3A and 3B. As selections are played, the total play time 201 and the number of selections in the queue (given by the highest-numbered position identifier 203) are continuously updated (step 301) and displayed on the output device 111 (step 302). Thus, customers can see the current ranking of all requested selections. The jukebox receives a new selection request and payment from the customer (step 303); the customer uses the input device 102 to identify his selection and makes payment using the payment acceptor 101. In step 304, the CPU 110 identifies available queue positions (that is, positions with an "available" status 204), the corresponding upgrade prices 206, and displays this information using the visual output device 111. The customer is then asked whether he wishes to upgrade the position status of the song purchased at step 303(step 305).

Although the upgrade price is described above as a fixed-price in addition to the price of a content selection, those of ordinary skill will readily appreciate that the upgrade prices may vary with other factors. Such factors might include time of day, current sales, current profitability, or the popularity of content. For reference to a jukebox that tracks the popularity of content, see U.S. Pat. No. 5,668,788, incorporated by reference herein. Additionally, instead of the upgrade price being determined by CPU 110, the customer could enter an indication of the price that they wish to pay either via input device 102 or via payment acceptor 101. Then the queue positions of various requests would be arranged in order of price paid or offered.

If the customer declines to purchase an upgrade, his request will go to the end of the queue; a new position identifier 203 is generated for his request (step 320). The CPU 110 generates a new position identifier 203 for the request by calculating a new position identifier by incrementing the last position identifier in the queue by one, and then enters the request as a new record in the queue table 132 including the calculated position identifier 203, content identifier 202, position status 204 ("available"), duration 205 and upgrade price 206.

If the customer agrees to purchase an upgrade, he must then indicate which position in the queue he wants and make payment for it, using the input device 102 and payment acceptor 101. The jukebox receives the requested position identifier 203, and the corresponding payment amount (step 306). The CPU 110 judges whether the amount of the additional payment is at least equal to the corresponding upgrade price (step 307); if not, it outputs an "insufficient funds" message to the customer using the output device 111 (step 330). If the customer has paid enough to purchase the desired upgrade, the CPU 110 enters the request in the queue table 132 using the position identifier received from the customer (step 308). In step 309, the CPU updates the position status 204 of the position just purchased from "available" to "locked."

In step 310, all requests with "available" position statuses and position identifiers greater than (that is, lower in priority than) the position identifier just received are shifted to a lower position in the queue by incrementing their position identifiers 204 by one. This prevents the "locked" requests from being "bumped" by the new request.

In step 311, the position statuses of all requests with position identifiers less than (that is, higher in priority than) the position identifier just received are altered to "locked." Accordingly, if another customer purchases a lower numbered position in the queue, the existing requests will not be displaced from their "locked" positions.

Finally, in step 312, the requested selections are played (output using the audio output device 112 conventionally), in the priority order listed in the queue table 132.

Queue Position Management Dependent on Market Forces

In this embodiment of the invention, a customer who purchases a lower numbered position in the queue could be bumped from that position by yet another customer, so that ultimately the order of queue positions would accurately reflect demand. Since no position in the queue would be "locked," the "position status" field 204 of the queue table 132 would not be needed.

Figure 4A:
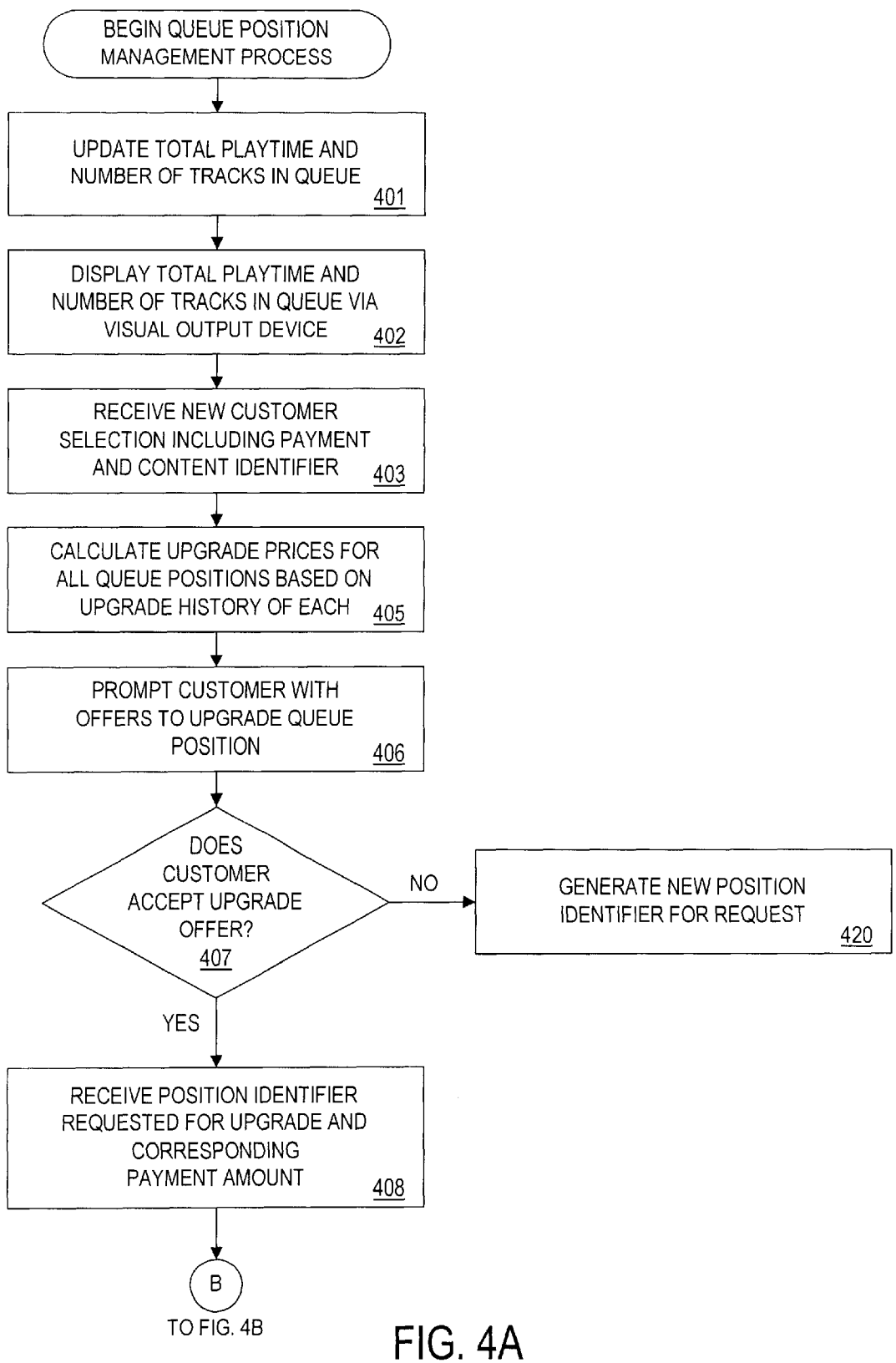
FIGS. 4A and 4B are connected flow charts showing the operation of the queue position management process in accordance with the second embodiment of the invention.
Figure 4B:
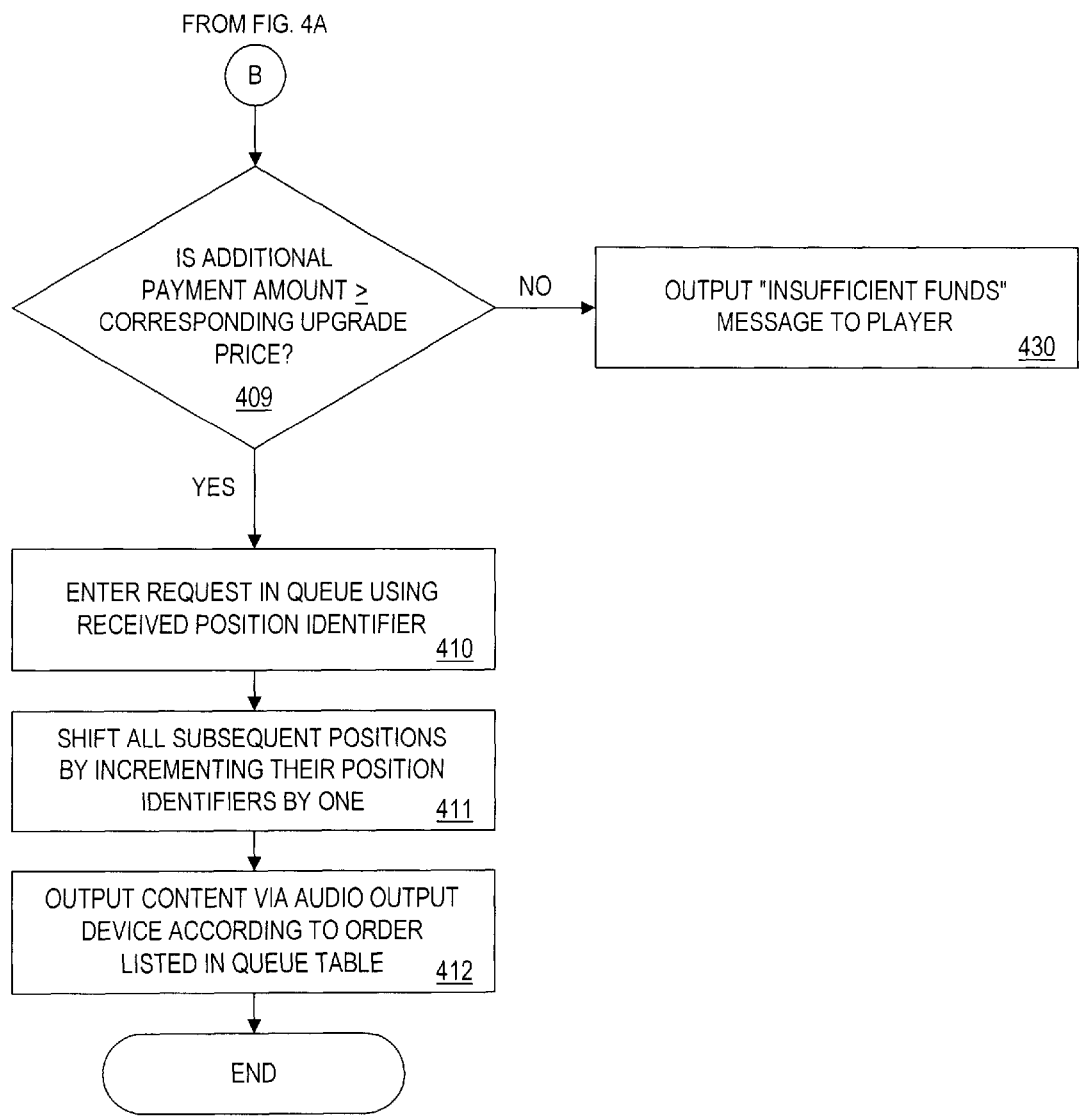

In this embodiment, the CPU 110 executes the process software 131 to perform the steps detailed in FIGS. 4A and 4B. As in the first embodiment, the total play time 201 and the number of selections in the queue (given by the highest-numbered position identifier 203) are continuously updated as selections are played (step 401) and displayed on the visual output device 111 (step 402). The jukebox receives a new request and payment from the customer (step 403); the customer uses the input device 102 to identify his selection and makes payment using the payment acceptor 101.

As noted above, it is a feature of this embodiment that all queue positions are available, with a "market price" for each position. In step 405, the CPU 110 calculates the upgrade price 206 for each queue positions, based on the upgrade history of that position.

The upgrade price of a given position may be based on how many requesters, songs or minutes would be displaced by putting a new request in that position. The price of "jumping ahead" would thus be proportional to the amount or the degree of services displaced.

In another variation of this embodiment, a customer may pay more to advance over requests that have previously been bumped than over those that have not been bumped. In this instance (as shown in FIG. 2B), a field 207 would be added to the queue table 132 to indicate how many times each request has been bumped. Then, when calculating the upgrade price for a queue position, the CPU 110 would tally the total number of bumps. This total number could be multiplied by a flat fee, such as $1.00, so that what the customer pays is equal to ($1.00×(total bumps)).

In a further variation, the jukebox may monitor and track the demand for all possible requests so that it costs more to bump more popular songs. This may be achieved using methods and principles known in the art (for example, as discussed in U.S. Pat. Nos. 4,232,295, 5,668,788 and European Patent Office publication EP 0 817 138 A1).

In step 406, the jukebox prompts the customer with an offer to upgrade the queue position for his request; this is done by displaying the upgrade price 206 for each of the various queue positions on the visual output device 111. As outlined just above, the price for a lower numbered queue position would generally be greater than for a higher numbered queue position.

If the customer agrees to purchase an upgrade (step 407), he must then indicate which position in the queue he wants and make payment for it, as in the first embodiment. The jukebox receives the requested position identifier 203, and the corresponding payment amount (step 408). If the customer declines to purchase an upgrade, his request will go to the end of the queue; a new position identifier 203 is generated for his request (step 420). The CPU 110 generates a new position identifier 203 for the request by incrementing the last position identifier in the queue by one, and enters the request as a new record in the queue table including the calculated position identifier, content identifier 202, duration 205 and upgrade price 206. As noted above, in this embodiment the upgrade price 206 may depend on the queue position 203, the number of times 207 the request has been bumped, or the popularity of the requested selection.

As in the first embodiment, the CPU 110 judges whether the amount of the additional payment is at least equal to the corresponding upgrade price (step 409); if not, it outputs an "insufficient funds" message to the customer using the output device 111 (step 430). If the customer has paid enough to purchase the desired upgrade, the CPU 110 enters the request in the queue table 132 using the position identifier received from the customer (step 410).

In step 411, the CPU 110 shifts all requests with position identifiers greater than the received position identifiers to a lower position in the queue by incrementing their position identifiers by one.

Finally, in step 412, the requested selections are played (output in a conventional manner using the audio output device 112), in the priority order listed in the queue table 132.

Other Embodiments

Code Generation—A regular customer may be given a code to input to the jukebox, enabling him to upgrade his request without making a payment. A restaurant, for example, might provide codes to customers as a reward for frequent patronage, or as a bonus for large purchases. The queue position allocation and management processes would function as described in FIGS. 3A–3B and 4A–4B, with the customer entering the purchase code at step 306 via input device 102. This code is then transmitted to CPU 110 and compared with the codes that may be stored in data storage device 130. If a matching code is identified, the process continues at step 308 in the queue position allocation process or at step 410 in the queue position management process.

Remote Network—The computer processing equipment (such as the CPU 110, data storage device 130, RAM 113 and ROM 114) may be resident in a server at a location remote from the conventional jukebox hardware (such as the CD player 120). In this embodiment, the jukebox is connected remotely to the server; there may be a plurality of jukeboxes connected to a single server. Remote jukebox connections are well known in the art and are described (for example) in U.S. Pat. Nos. 4,232,295, 5,341,350 and 5,355,302.

Network with Point-of-Sale System Connectivity—In this embodiment, the jukebox 100 is remotely connected to a point-of-sale system via communication port 150 and network 175. The point-of-sale system tracks various customers' bar or restaurant tabs. The jukebox queue position could be based on the customer's current bar tab. For example, a customer may have a card with an ID number encoded on a magnetic stripe. The customer would register his card number using a magnetic stripe reader on the jukebox. Then, the point-of-sale system would match the card number to all the card numbers received and held for outstanding bar tabs. The system would then prioritize the juke box queue in order from the highest to the lowest outstanding bar tab. In this manner, the party spending the most money would hear their requested songs from the jukebox first.

Multiple Queues—The jukebox 100 may have multiple queues (that is, two or more different queue tables 132) where one queue has a higher priority than another. Selections on the first-priority queue would be played before those on the second-priority queue. A customer would pay a premium to have his request placed on a higher-priority queue, and then pay an additional amount to have his request upgraded on that queue.

Upgrading or Downgrading Another Customer's Request—In this alternate embodiment, a customer could enter the content identifier of a request already in the queue via input device 102, receive an upgrade price corresponding to the content identifier in queue table 132, and then pay to have it upgraded or downgraded.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A method, comprising:
    arranging a plurality of service identifiers in a queue associated with a vending machine, the queue having a top and a bottom;
    receiving a request to place a first service identifier in an intermediate position in the queue, the intermediate position not being at the top of the queue and not being at the bottom of the queue;
    receiving a payment associated with the request; and
    in response to the request and the payment, placing the first service identifier at the intermediate position in the queue.

2. The method of claim 1, wherein the vending machine comprises a jukebox and the first service identifier is associated with a song selection.

3. The method of claim 2, further comprising placing a second service identifier in a position in the queue that is closer to the top of the queue than the first service identifier.

4. A method, comprising:
    arranging a plurality of service identifiers in a queue associated with a vending machine;
    receiving a first request to change the position of a first service identifier in the queue;
    receiving a first payment associated with the first request;
    in response to the first payment and the first request, moving the first service identifier towards a top of the queue;
    receiving a second request to change the position of a second service identifier in the queue;
    receiving a second payment associated with the second request; and
    in response to the second payment and the second request, moving the second service identifier to a position in the queue that is ahead of the first service identifier.

5. The method of claim 4, wherein the vending machine comprises a jukebox and the first and second service identifiers are associated with respective song selections.

6. An apparatus for managing a queue of a jukebox, the apparatus comprising:
    a memory for storing:
        a plurality of service identifiers forming a queue, each of the service identifiers corresponding to a respective song selection; and
        a program code for arranging the service identifiers;
    a processor connected to the memory; and
    a point-of-sale system connected to the processor;
    wherein the processor is operative to execute the program code to perform the steps of:
        arranging the plurality of service identifiers based upon a time of receipt corresponding to each service identifier;
        receiving information from the point-of-sale system;
        rearranging the plurality of service identifiers on the basis of the information received from the point-of-sale system; and
        playing the song selections in accordance with an order of the rearranged plurality of service identifiers.

7. A method, comprising:
    arranging a plurality of service identifiers in a queue associated with a vending machine;
    receiving a request to change the position of a first service identifier in the queue;
    receiving a code associated with the request;
    determining whether the received code matches a stored code; and
    if it is determined that the received code matches the stored code, changing the position of the first service identifier in the queue in accordance with the request.

8. The method of claim 7, wherein the vending machine comprises a jukebox and the first service identifier is associated with a song selection.

* * * * *